US012338783B2

(12) United States Patent
Torkildsen

(10) Patent No.: US 12,338,783 B2
(45) Date of Patent: Jun. 24, 2025

(54) GENERATOR SYSTEM FOR RESOURCE EXTRACTION AND INJECTION SYSTEM

(71) Applicant: Schlumberger Technology Corporation, Sugar Land, TX (US)

(72) Inventor: Bernt Helge Torkildsen, Sandsli (NO)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 18/564,817

(22) PCT Filed: May 27, 2022

(86) PCT No.: PCT/US2022/031343

§ 371 (c)(1),
(2) Date: Nov. 28, 2023

(87) PCT Pub. No.: WO2022/251634

PCT Pub. Date: Dec. 1, 2022

(65) Prior Publication Data

US 2024/0271591 A1 Aug. 15, 2024

Related U.S. Application Data

(60) Provisional application No. 63/194,550, filed on May 28, 2021.

(51) Int. Cl.
*F03B 13/06* (2006.01)
*E21B 41/00* (2006.01)
(52) U.S. Cl.
CPC .......... *F03B 13/06* (2013.01); *E21B 41/0085* (2013.01); *F05B 2220/706* (2013.01)

(58) Field of Classification Search
CPC ... F03B 13/06; F05B 2220/70; E21B 41/0085
See application file for complete search history.

(56) References Cited

U.S. PATENT DOCUMENTS

| | | | |
|---|---|---|---|
| 3,939,356 A | 2/1976 | Loane | |
| 4,132,269 A * | 1/1979 | Chasteen | E21B 41/0085 |
| | | | 166/305.1 |
| 9,476,427 B2 | 10/2016 | Torkildsen | |
| 2009/0014170 A1 | 1/2009 | Zubrin | |
| 2010/0077749 A1 | 4/2010 | Riley | |
| 2012/0247831 A1 | 10/2012 | Kaasa | |
| 2013/0074757 A1 | 3/2013 | McAlister | |
| 2016/0380560 A1 | 12/2016 | Torrey | |
| 2017/0077847 A1 | 3/2017 | Torrey | |
| 2019/0292894 A1 | 9/2019 | Xiao | |
| 2020/0224520 A1 | 7/2020 | Curlett | |
| 2022/0364442 A1* | 11/2022 | Petty | E21B 41/0085 |
| 2024/0263547 A1 | 8/2024 | Torkildsen | |

FOREIGN PATENT DOCUMENTS

| | | | |
|---|---|---|---|
| GB | 2549558 A | 10/2017 | |
| GB | 2550325 A * | 11/2017 | E21B 43/20 |
| WO | 2014083055 A2 | 6/2014 | |

* cited by examiner

*Primary Examiner* — Sean Gugger
(74) *Attorney, Agent, or Firm* — Jeffrey D. Frantz

(57) ABSTRACT

A resource extraction and/or injection system includes an injection system configured to direct a fluid into a reservoir via a well for storage in the reservoir to facilitate extraction of resources from the reservoir and a generator configured to convert potential energy of the fluid into electrical energy via flow of the fluid through the well.

20 Claims, 7 Drawing Sheets

GENERATOR SYSTEM FOR RESOURCE EXTRACTION AND INJECTION SYSTEM

CROSS-REFERENCE TO RELATED APPLICATION APPLICATIONS

This application is a National Stage Entry of, and claims priority to and the benefit of, PCT Application No. PCT/US2022/031343, entitled "GENERATOR SYSTEM FOR RESOURCE EXTRACTION AND INJECTION SYSTEM," filed May 27, 2022, which claims priority to and the benefit of U.S. Provisional Application No. 63/194,550, entitled "SUBSEA POWER SYSTEM AND METHOD," filed May 28, 2021, which are hereby incorporated by reference in [its] their entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

In resource extraction operations, hydrocarbon fluids (e.g., oil and natural gas) are obtained from subterranean geologic formation, referred to as a reservoir, by drilling a well that penetrates the subterranean geologic formation. The hydrocarbon fluid may then be extracted via the well and directed for further processing, such as refinement. Operation of a resource extraction system to extract the hydrocarbon fluid from a reservoir may consume energy, such as electrical energy. Fluid may also be injected into a reservoir during fluid injection operations. For example, different fluids such as water, water with dissolved carbon dioxide, carbon dioxide, ammonia, hydrogen, and so forth may be injected into subterranean geologic formations via wells that penetrate the subterranean geologic formation. Fluids may be injected into subterranean geologic formations for many different reasons, such as to enhance hydrocarbon extraction operation, temporarily store energy carriers, or permanently store greenhouse gases. However, fluid injection operations generally consume energy. Accordingly, a need exists to perform fluid injection operations without a substantial increase in energy costs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a resource extraction and/or injection system includes an injection system configured to direct a fluid into a reservoir via a well for storage in the reservoir and a generator configured to convert potential energy of the fluid into electrical energy via flow of the fluid through the well.

In an embodiment, a system includes a generator system having a turbine and configured to generate electrical energy via rotation of the turbine. The system also includes an injection system configured to direct a fluid through the generator system and into a reservoir for storage in the reservoir. The flow of the fluid through the generator system causes the rotation of the turbine, thereby causing the generator system to generate the electrical energy.

In an embodiment, a resource extraction system includes a fluid injection system configured to inject a fluid into a reservoir via a well for storage within the reservoir, a turbine configured to rotate via flow of the fluid therethrough toward the reservoir, and a generator coupled to the turbine, wherein the generator is configured to generate electrical energy via rotation of the turbine caused by the flow of the fluid.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
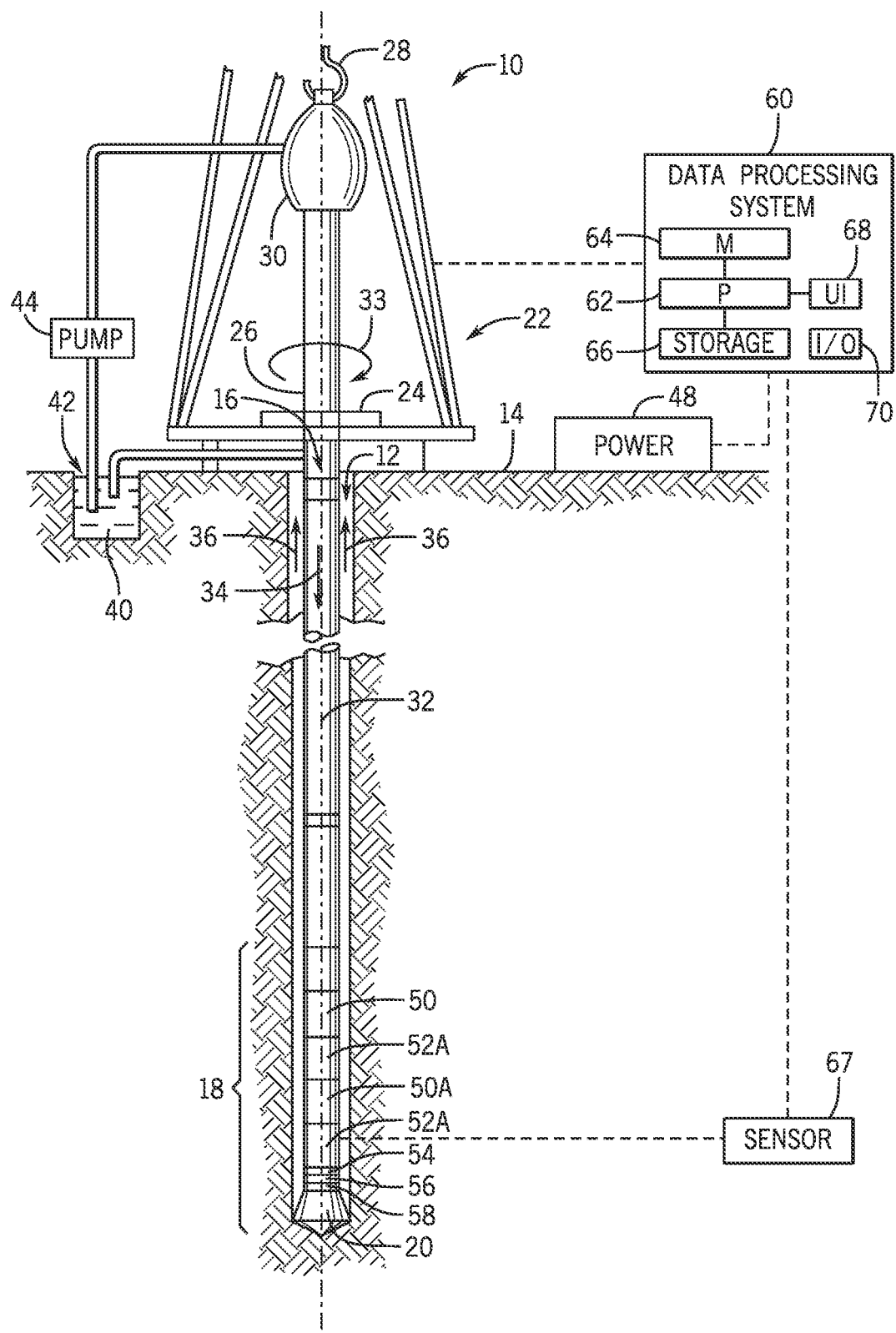
FIG. 1 is a schematic illustration of a resource extraction system that may be used to extract resources, such as hydrocarbon fluids, according to an embodiment of the present disclosure.

One or more specific embodiments of the present disclosure will be described below. The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience but does not require any particular orientation of the components relative to some fixed reference, such as the direction of gravity. The term "fluid" encompasses liquids, gases, vapors, and combinations thereof. Numerical terms, such as "first," "second," and "third" are used to distinguish components to facilitate discussion, and it should be noted that the numerical terms may be used differently or assigned to different elements in the claims.

Certain terms are used throughout the description and claims to refer to particular features or components. As one skilled in the art will appreciate, different persons may refer to the same feature or component by different names. This document does not intend to distinguish between components or features that differ in name, but not function.

This disclosure herein generally involves a resource extraction system. A resource extraction system may extract resources, such as a hydrocarbon fluid (e.g., oil and/or natural gas), from a reservoir. For example, a drilling system may form a wellbore through a surface (e.g., an onshore surface, an offshore surface) into the reservoir to access the resources. The resource extraction system may utilize the wellbore to extract the resources from the reservoir. In some embodiments, the resource extraction system may direct the resources from the reservoir, through the wellbore, and to a resource processing system or facility, which may then process the resources, such as to refine the resources and/or develop products using the resources.

The resource extraction system may utilize a pressure of the reservoir to facilitate extraction of resources. For example, when the pressure is relatively higher, the resources may naturally flow from the reservoir for extraction, such as without having to actively pressurize or pump the resources from the reservoir. When the pressure is relatively lower, the resource extraction system may pressurize the resource to extract the resources. Continual extraction of resources may further reduce the pressure of the reservoir. When the pressure of the reservoir is below a threshold pressure indicating the amount of resources in the reservoir is low, the pressurization provided by the resource extraction system may not extract the resources as desired, such as at a desirable flow rate. In such circumstances, a fluid may be directed into the reservoir. The fluid may be stored in the reservoir to fill or plug the reservoir, thereby sealing the reservoir and enabling desirable abandonment of the reservoir when it is no longer desirable or feasible to extract resources from the reservoir. Additionally or alternatively, the fluid may be directed into the reservoir to increase the pressure of the reservoir and enable additional extraction of resources from the reservoir, such as via the pressurization provided by the resource extraction system. In the following discussion, any reference to fluid injection into the reservoir is intended to include fluid injection merely for filling the reservoir, storing the fluid permanently or for later extraction, raising the pressure to help extract more resources over time, or any combination thereof. For a reservoir at the end of its life, the fluid injection may be used to help offset the costs associated with abandoning the reservoir, as energy can be generated by injecting the fluid into the well.

As discussed in further detail below, the fluid (e.g., liquid) may be driven to flow naturally by gravity toward the reservoir, as the fluid may be at a substantial elevation above the reservoir and/or the fluid may be at a substantial pressure greater than the reservoir. As an example, water from a body of water (e.g., an ocean) may be directed into a reservoir that is below the body of water, such that gravity and hydrostatic pressure drive the water to flow into the reservoir. Thus, if the water pressure is sufficiently high, then the water can flow into the reservoir without the need for any fluid pumps.

It may be desirable to improve operation of the resource extraction system. As an example, it may be desirable to improve efficiency of the resource extraction system, such as by reducing an overall amount of energy (e.g., electrical energy) used to operate the resource extraction system. Thus, embodiments of the present disclosure may be directed to a resource extraction and/or injection system having a generator system configured to generate electrical energy during operation of the resource extraction and/or injection system and to direct fluid into the reservoir. Indeed, the embodiments of the present disclosure may include a generator system configured to convert potential energy of a fluid into electrical energy via flow of the fluid into a reservoir or any other type of subterranean geologic formation. The fluid may be directed through the generator system to cause the generator system to generate electrical energy. For instance, the fluid may drive rotation of a turbine of the generator system, and the rotation of the turbine may cause corresponding rotation of an electrical generator to generate electrical energy. In this manner, as fluid is directed into the reservoir or subterranean geologic formation, electrical energy is generated. For example, the generated electrical energy may be utilized by a resource extraction system to reduce the overall cost of operating the resource extraction system or it may be utilized by any other independent energy consuming system.

To help illustrate the techniques described herein, FIG. 1 shows one embodiment of a resource extraction system 10 at a well site, in which the resource extraction system 10 may be used to form a borehole 12 (e.g., wellbore) through geological formations 14 that may be onshore or offshore. In some embodiments, the resource extraction system 10 may also facilitate milling operations to cut metal objects to be removed from the borehole 12 and/or plugging and abandonment operations to close the borehole 12. The resource extraction system 10 may include a drill string 16 suspended within the borehole 12, and the resource extraction system 10 may have a bottom hole assembly (BHA) 18 that includes a drill bit 20 at its lower end, in which the drill bit 20 engages the geological formations 14. The drill bit 20 includes any cutting structure (e.g., a reamer) that may be used to engage and cut the geological formations 14.

The resource extraction system 10 also includes a surface system 22 that rotates and drives the drill string 16. In some embodiments, the resource extraction system 10 may include a kelly system having a rotary table 24, a kelly 26, a hook 28, and a rotary swivel 30. The drill string 16 may be coupled to the hook 28 through the kelly 26 and the rotary swivel 30. The rotary swivel 30 may be suspended from the hook 28 that is attached to a traveling block (not shown) that drives the drill string 16 relative to the surface system 22 along an axis 32 that extends through a center of the borehole 12. Furthermore, the rotary swivel 30 may permit rotation of the drill string 16 relative to the hook 28, and the rotary table 24 may rotate in a rotational direction 33 to drive the drill string 16 to rotate concentrically about the axis 32. Alternatively, the resource extraction system 10 may be a top drive system that rotates the drill string 16 via an internal drive (e.g., an internal motor) of the rotary swivel 30. That is, the resource extraction system 10 may not use the rotary table 24 and the kelly 26 to rotate the drill string 16. Rather, the internal drive of the rotary swivel 30 may drive the drill string 16 to rotate in the rotational direction 33 relative to the hook 28 concentrically about the axis 32.

As the surface system 22 rotates the drill string 16, the surface system 22 may further drive the drill string 16 in axial directions to engage the drill string 16 with the geological formations 14. For example, the drill string 16 may be driven into the geological formation 14 through the borehole 12 in a first axial direction 34, which may be a generally downward vertical direction. Additionally, the drill string 16 may be removed from the borehole 12 in a second axial direction 36 opposite the first axial direction 34. That is, the second axial direction 36 may be a generally upward vertical direction. The combined axial and rotational movement of the drill string 16 may facilitate engagement of the drill string 16 with the geological formations 14. Although FIG. 1 illustrates that the drill string 16 is driven in generally vertical directions, the drill string 16 may navigate through the borehole 12 in directions crosswise to the first and second axial directions 34, 36, such as transitioning to a generally horizontal direction.

The surface system 22 may also include mud or drilling fluid 40 that may be directed into the drill string 16 to cool and/or lubricate the drill bit 20. Additionally, the drilling fluid 40 may exert a mud pressure on the geological formations 14 to reduce likelihood of fluid from the geological formations 14 flowing into and/or out of the borehole 12. In some embodiments, the drilling fluid 40 may be stored in a pit 42 formed at the well site. A pump 44 may fluidly couple the pit 42 and the swivel 30 to one another, in which the pump 44 may deliver the drilling fluid 40 to the interior of the drill string 16 via a port in the swivel 30, causing the drilling fluid 40 to flow downwardly through the drill string 16 in the first axial direction 34. The drilling fluid 40 may also exit the drill string 16 via ports in the drill bit 20 and flow into the borehole 12 toward the surface (e.g., toward the surface system 22). While drilling, the drilling fluid 40 may circulate upwardly in the second axial direction 36 through an annulus region between the outside of the drill string 16 and a wall of the borehole 12, thereby carrying drill cuttings away from the bottom of the borehole 12. Once at the surface, the returned drilling fluid 40 may be filtered and conveyed back to the pit 42 for recirculation and reuse.

The BHA 18 of the resource extraction system 10 of FIG. 1 may include various downhole tools, such as a logging-while-drilling (LWD) module 50 and/or a measuring-while-drilling (MWD) module 52. Generally, the downhole tools may facilitate determining a performance of the drill string 16, such as by determining a parameter of the drill string 16, of the surrounding geological formation 14, and the like. It should also be noted that more than one LWD module 50 and/or MWD module 52 may be employed. For example, the BHA 18 may include an additional LWD module 50A and/or an additional MWD module 52A positioned adjacent to the drill bit 20. As such, references made to the LWD module 50 may also refer to the LWD module 50A and references made to the MWD module 52 may also refer to the MWD module 52A.

The LWD module 50 and/or the MWD module 52 may each be housed in a special type of drill collar and may contain one or more types of logging tools. In general, the LWD module 50 may include capabilities for measuring, processing, and storing information, and the MWD module 52 may contain one or more devices for measuring characteristics of the drill string 16 and/or the drill bit 20, as well as for communicating with surface equipment. In the resource extraction system 10 of FIG. 1, the LWD module 50 and/or the MWD module 52 may include one or more of the following types of measuring devices: a weight-on-bit measuring device, a torque measuring device, a bend measuring device, a vibration measuring device, a shock measuring device, a stick slip measuring device, a direction measuring device, and/or an inclination measuring device.

In certain embodiments, the BHA 18 may also include an apparatus for generating electrical energy. For example, the BHA 18 may include a compressor and turbine system that may generate electrical energy from the flow of fluid (e.g., the drilling fluid 40, fluid from the geological formations 14) through the borehole 12. The electrical energy generated by the BHA 18 may be used to provide energy to the resource extraction system 10. In additional or alternative embodiments, the resource extraction system 10 may include a power source 48, such as an electrical generator and/or an electrical energy storage device, that supplies energy to the resource extraction system 10. In any case, electrical energy may be used to operate the aspects of the resource extraction system 10, such as to control the BHA 18.

The BHA 18 may further include a motor 54 and/or a rotary-steerable system (RSS) 56 coupled to the drill bit 20 via additional tubulars 58. The motor 54 and/or the RSS 56 are used to regulate operation of the drill bit 20 to engage with the geological formations 14. For example, the RSS 56 may orient the drill bit 20 in a desirable direction while the motor causes the drill bit 20 to rotate continuously to drill the borehole 12. Generating continuous rotation may enable improved transportation of drilled cuttings to the surface, better cutting of the borehole 12, limited stress imparted upon the drill bit 20 by the geological formations 14, and so forth. Furthermore, the RSS 56 may enable control of the engagement of the drill string 16 with the geological formations 14. By way of example, the RSS 56 may place the drill string 16 in communication with the surface system 22. As such, the surface system 22 may control a direction or path for the drill string 16 to form the borehole 12 and/or a manner in which the drill string 16 engages with the geological formations 14 (e.g., a rotation of the drill string 16).

In certain embodiments, the drill string 16 may include or be communicatively coupled with a data processing system 60 that may adjust the operation of the resource extraction system 10, such as to direct the drill string 16 through the borehole 12. The data processing system 60 may include one or more processors 62, such as a general purpose microprocessor, an application specific processor (ASIC), and/or a field programmable gate array (FPGA) or other programmable logic device. The one or more processors 62 may execute instructions stored in a memory 64 and/or a storage 66, which may be read-only memory (ROM), random-access memory (RAM), flash memory, an optical storage medium, a hard disk drive, and the like. The data processing system 60 may further be communicatively coupled with a sensor 67 that may determine an operating parameter of the drill string 16. As an example, the sensor 67 may be a position sensor, and the operating parameter may indicate an orientation of the drill string 16. The sensor 67 may transmit signals or data to the data processing system 60 indicative of the operating parameter. The data processing system 60 may operate the resource extraction system 10, such as to adjust the direction through which the drill string 16 forms the borehole 12, based on the signals received from the sensor 67.

Although the illustrated embodiment of the data processing system 60 is located external to the drill string 16, the data processing system 60 may alternatively be a part of the drill string 16, such as disposed within the BHA 18. The data processing system 60 may alternatively be a device located proximate to the drilling operation (e.g., at the surface system 22) and/or a remote data processing device located away from the resource extraction system 10, such as a mobile computing device (e.g., tablet, smart phone, laptop) or a server remote from the resource extraction system 10. The data processing system 60 may process downhole measurements in real time or sometime after the data has been collected. In general, the data processing system 60 may store and process collected data, such as data collected in the BHA 18 via the LWD module 50, the MWD module 52, and/or any suitable telemetry (e.g., electrical signals pulsed through the geological formations 14 or mud pulse telemetry using the drilling fluid 40). In further embodiments, separate data processing systems 60 may be used to direct the drill string 16, to rotate the drill string 16, and/or to raise or lower the drill string 16.

In some embodiments, the data processing system 60 may also include a user interface 68 that may enable a user to interact with the data processing system 60. For example, the user may input properties and/or instructions (e.g., control commands) to the data processing system 60 via the user interface 68. To this end, the user interface 68 may include a button, a keyboard, a microphone, a mousing device, a trackpad, and the like. The user interface 68 may also include a display, which may be any suitable electronic display that is displays visual representations of information, such as graphical representations of collected data.

Further still, the data processing system 60 may include input/output (I/O) ports 70 that enable the data processing system 60 to communicate with various electronic devices. For example, the I/O ports 70 may enable the data processing system 60 to directly couple to another electronic device (e.g., a mobile device) to enable data to transfer between the data processing system 60 and the electronic device. The I/O ports 70 may additionally or alternatively enable the data processing system 60 to indirectly couple to other electronic devices. In another example, the I/O ports 70 may enable the data processing system 60 to couple to a network, such as a personal area network (PAN), a local area network (LAN), and/or a wide area network (WAN). Accordingly, in some embodiments, the data processing system 60 may receive data (e.g., as signals) from another electronic device (e.g., a base-station control system) and/or communicate data to another electronic device via the I/O ports 70.

After the borehole 12 has been formed via the resource extraction system 10, a resource flow may be directed through the borehole 12, such as in the second axial direction 36, for extraction. As an example, the borehole 12 may extend to a reservoir containing the resource flow. In some circumstances, the pressure of the reservoir may be relatively low, and the resources may not readily flow from the reservoir through the borehole 12 for extraction. In such circumstances, a fluid flow may be injected into the reservoir, such as to seal the reservoir. Energy from the fluid flow injected into the reservoir may be harnessed to operate the resource extraction system 10. For instance, as described herein, potential energy may be extracted from the fluid and used to generate electrical energy, and the electrical energy may be utilized to operate a component of the resource extraction system 10.

Figure 2:
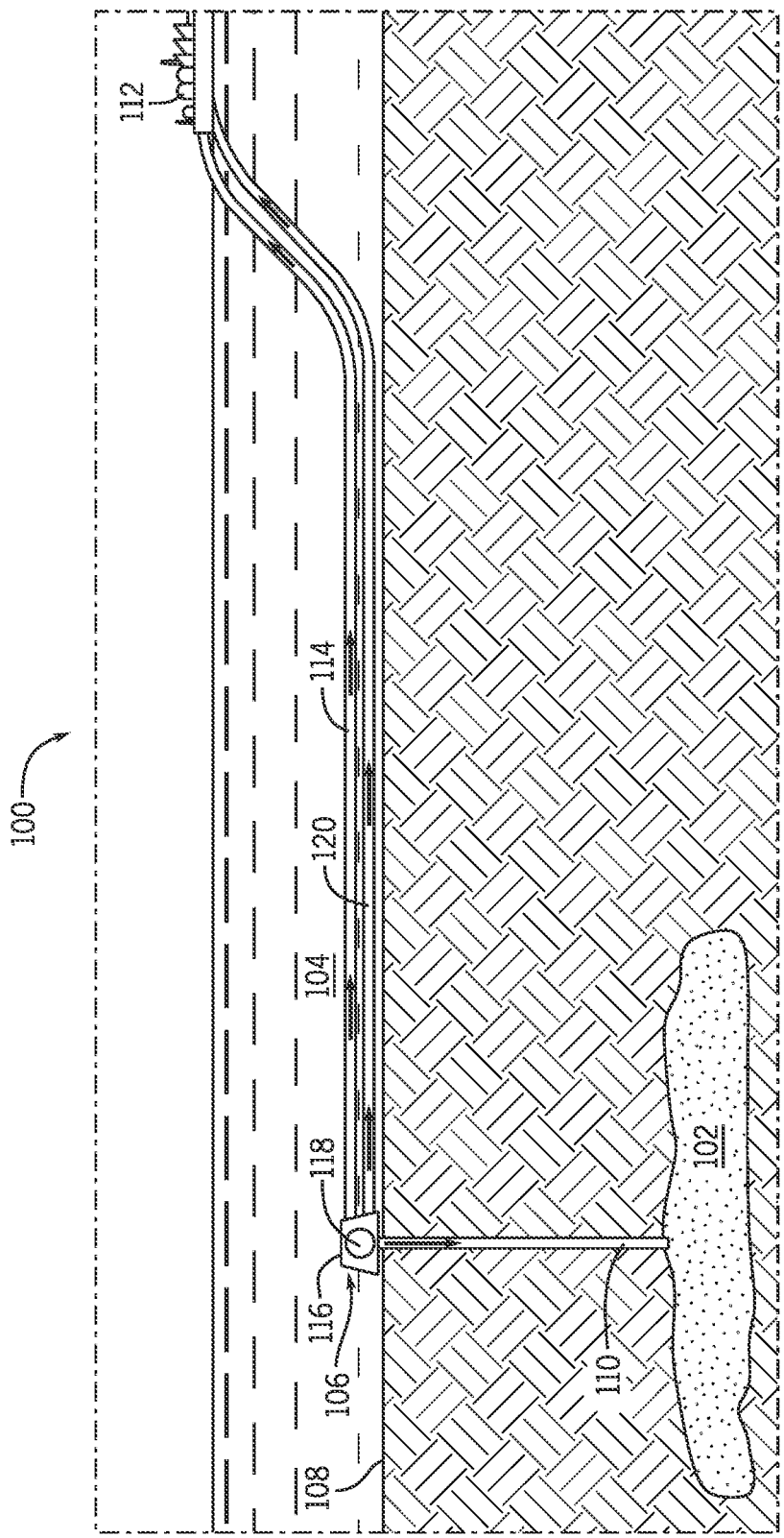
FIG. 2 is a schematic illustration of a resource extraction and/or injection system that may include a fluid injection system configured to inject fluid into a reservoir, according to an embodiment of the present disclosure.

FIG. 2 is a schematic illustration of a system 100, such as a resource extraction, injection, and/or processing system, configured to extract resources (e.g., hydrocarbon fluid) from a reservoir 102, which may be positioned beneath a body of water 104 (e.g., an ocean). The system 100 may include a resource extraction system 106, which may include a subsea system positioned on a sea floor 108 and may extract resources from the reservoir 102 via a well 110 that may extend through the sea floor 108 and into the reservoir 102. The resources extracted from the reservoir 102 may be processed. For instance, the system 100 may include a resource processing system or facility 112, which may receive the extracted resources and perform various operations, such as refinement and/or transportation of the resources. To this end, the system 100 may include a pipeline system 114, which may include a conduit or tubing, configured to deliver resources to the resource processing system 112. For example, the pipeline system 114 may fluidly couple the well 110 to the resource processing system 112. Thus, the pipeline system 114 may direct resources extracted by the resource extraction system 106 to the resource processing system 112.

The pressure within the reservoir 102 may contribute to extraction of the resources via the resource extraction system 106. For example, a high pressure within the reservoir 102 may force resource flow through the well 110, into the pipeline system 114, and toward the resource processing system 112. In some embodiments, a pump or compressor may increase the pressure of the resource flow to enable directing of the resources through the well 110 and/or the pipeline system 114. However, while the pressure within the reservoir 102 is low or below a threshold pressure, resources may not readily flow from the reservoir 102 and toward the resource processing system 112, even upon pressurization via the resource extraction system. In such circumstances, the resource extraction system 106 may be configured to direct fluid into the reservoir 102 for storage in the reservoir 102. By way of example, the resource extraction system 106 may include an injection system 116 configured to inject fluid into the reservoir 102. In some embodiments, the injection system 116 may direct fluid (e.g., water) from the body of water 104 into the reservoir 102. In additional or alternative embodiments, the injection system 116 may direct a different fluid, such as a stored fluid (e.g., a process fluid stored at the resource processing system 112) into the reservoir 102. Injecting the fluid into the reservoir 102 may fill and/or plug the reservoir 102 and enable abandonment of the reservoir 102 when it is no longer desirable to extract resources from the reservoir 102.

In certain embodiments, a mixture of the fluid and another substance that may be soluble in the fluid may be directed into the reservoir 102. By way of example, carbon dioxide may be pressurized and dissolved into the fluid, and the mixture of the fluid and carbon dioxide may be directed into the reservoir 102 where the carbon dioxide may be stored via solubility trapping within the fluid (e.g., brine). For instance, carbon dioxide may be directed from the atmosphere and into the reservoir 102 to reduce an amount of carbon dioxide in the atmosphere, thereby improving an environmental impact provided by the system 100. In additional or alternative embodiments, any other suitable element or chemical compound may be mixed with the fluid and directed into the reservoir 102.

The resource extraction system 106 may include a generator system 118 configured to generate electrical energy. As an example, the fluid injected into the reservoir 102 may be directed through the generator system 118, and the generator system 118 may convert potential energy of the flow into electrical energy. For instance, the generator system 118 may include a turbine, the fluid flow toward the reservoir 102 may drive rotation of the turbine, and the rotation of the turbine may cause the generator system 118 to generate electrical energy.

The electrical energy generated by the generator system 118 may be used to facilitate operation of the system 100. As an example, components of the resource extraction system 106 (e.g., the injection system 116) may consume the generated electrical energy to operate and extract the resources from the reservoir 102. As another example, the system 100 may include an electrical connector 120 (e.g., a wire, a cable, a conductor) electrically connected to the generator system 118. The electrical connector 120 may receive the electrical energy generated by the generator system 118 and direct the electrical energy to another part of the system 100. For instance, the electrical connector 136 may be electrically coupled to components of the resource processing system 112, and the components may receive the electrical energy and utilize the electrical energy to operate various functions of the resource processing system 112, such as to process received resources. In this manner, operation of the generator system 118 may reduce an overall amount of energy consumed by the system 100. In certain embodiments, the generated electrical energy may be used to power monitoring equipment (e.g., monitoring electronics, sensors), control equipment (e.g., local controllers and/or distributed controllers), communications equipment (e.g., wired and/or wireless communications circuitry), flow control equipment (e.g., electrically actuated valves, chokes, blowout preventers, pumps, compressors), chemical injection systems, or any combination thereof.

In additional or alternative embodiments, the electrical energy generated via the generator system 118 may be stored for later usage. For example, the system 100 may include power storage (e.g., one or more batteries at the resource processing system 112) configured to receive (e.g., via the electrical connector 120) and store the electrical energy. The stored electrical energy may be readily accessible from the power storage at a later time for consumption. In further embodiments, the generated electrical energy may be distributed to an electrical grid to reduce a cost associated with energy consumption (e.g., energy distributed from the electrical grid for operating the system 100). In any case, operation of the generator system 118 may improve energy efficiency associated with the system 100.

The resources may also be directed from the reservoir 102 through the generator system 118 in some embodiments (e.g., while the pressure of the reservoir 102 is above the threshold pressure). In such embodiments, the generator system 118 may be configured to generate electrical energy via rotation of the turbine caused by the resource flow through the generator system 118 for extraction from the reservoir 102 in addition to generating electrical energy via rotation of the turbine caused by the fluid flow through the generator system 118 for injection into the reservoir 102. Indeed, any suitable material flow through the generator system 118 may cause the generator system 118 to generate electrical energy that may be utilized to operate the system 100.

It should be noted that the resource extraction system 106 may be implemented for any suitable system 100 and/or at any suitable life cycle of the operation of a system 100. As an example, a system 100 may be retrofitted with the resource extraction system 106, such as at a life cycle of operation in which the pressure of the reservoir 102 is below the threshold pressure (e.g., to place the reservoir 102 in condition for abandonment). Thus, the resource extraction system 106 may be implemented in an existing system 100 to enable the existing system 100 to direct fluid into the reservoir 102 and generate electricity via the fluid directed into the reservoir 102.

Figure 3:
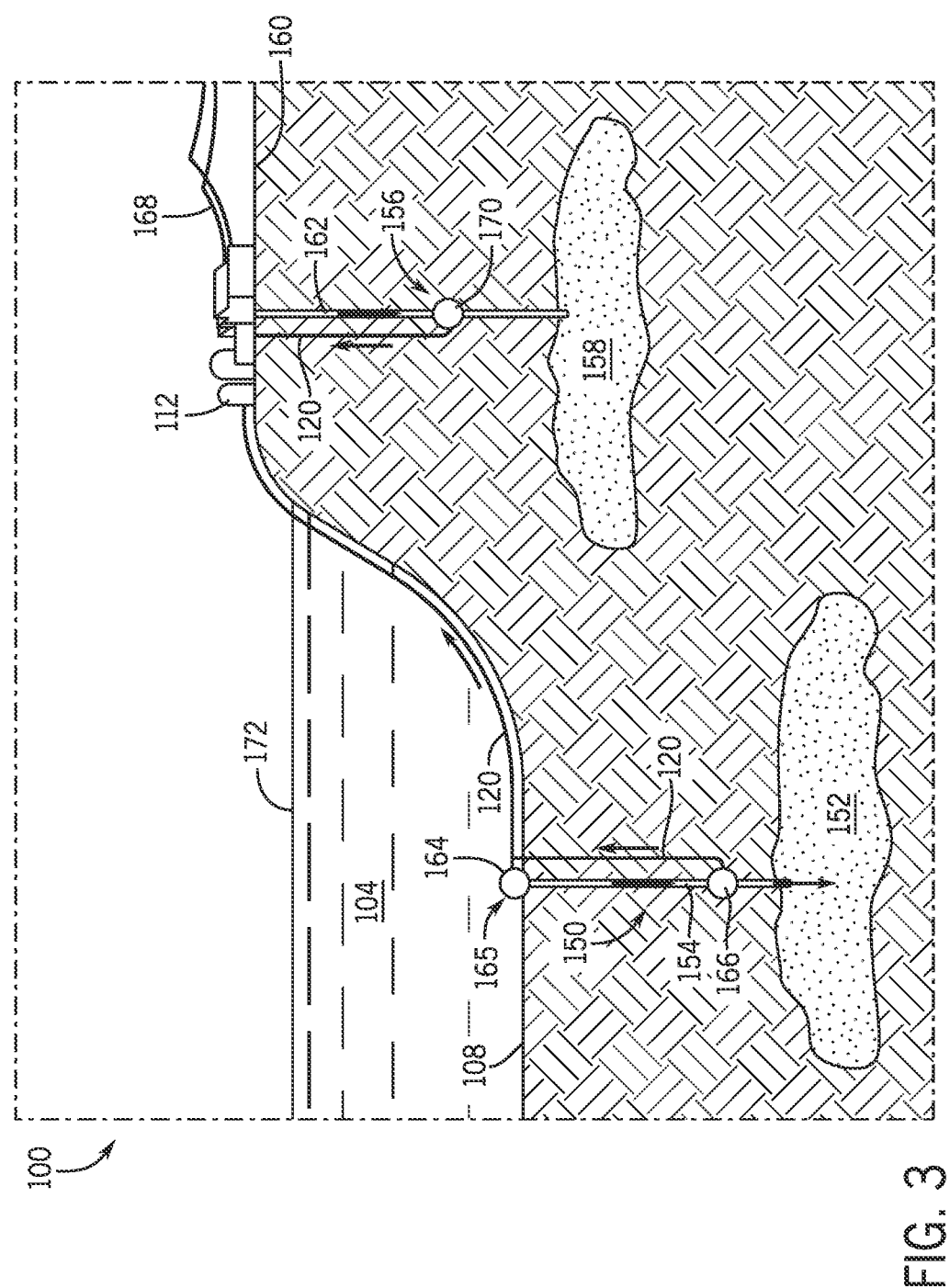
FIG. 3 is a schematic illustration of a system that includes multiple resource extraction systems configured to extract resources from different reservoirs, and each resource extraction system includes a fluid injection system, according to an embodiment of the present disclosure.

FIG. 3 is a schematic illustration of the system 100 having multiple resource extraction systems. A first resource extraction system 150 may include a subsea system configured to extract resources from a first reservoir 152 via a first well 154 that extends through the sea floor 108 of the body of water 104 and into the first reservoir 152. A second resource extraction system 156 positioned external to the body of water 104 may extract resources from a second reservoir 158, which may be positioned beneath a dry land surface 160. Thus, the second reservoir 158 may be accessible via onshore drilling to form a second well 162 that extends through the dry land surface 160 and into the second reservoir 158. The second resource extraction system 156 may be configured to extract resources from the second reservoir 158 via the second well 162. Thus, each of the resourced extraction systems 150, 156 may extract resources from the reservoirs 152, 158 via different wells 154, 162.

Each of the resource extraction systems 150, 156 may utilize a respective injection system configured to inject a fluid into the reservoirs 152, 158. The fluid may include a liquid, a gas, a solid particulate, or a combination thereof. For example, the fluid may include water (e.g., fresh water, salt water, steam), water with gas, water with a solid particulate, a process fluid (e.g., nitrogen, hydrogen, ammonium, carbon dioxide, natural gas, a polymeric solution), or any combination thereof. By further example, the fluid may include a liquefied gas (e.g., liquefied carbon dioxide) alone or in combination with other fluids as discussed above. However, in certain embodiments, a liquid (e.g., water) may be readily available for injection into the reservoirs 152, 158, and the absence of solid particulate may help extend the life of the turbine. As an example, the injection system of the first resource extraction system 150 may direct water from the body of water 104 into the first reservoir 152, and/or the injection system of the second resource extraction system 156 may direct a process fluid from the resource processing system 112 into the second reservoir 158. As another example, the injection system of the first resource extraction system 150 may direct a process fluid from the resource processing system 112 into the first reservoir 152, and/or the injection system of the second resource extraction system 156 may direct water from the body of water 104 into the second reservoir 158. To this end, the pipeline system 114 and/or an additional pipeline system of the system 100 may direct the water from the body of water 104 to the second resource extraction system 156 positioned external to the body of water 104 and/or direct the process fluid from the resource processing system 112 to the first resource extraction system 150 positioned within the body of water 104.

In certain embodiments, the fluid may readily flow into the reservoirs 152, 158 via a gravitational force and/or hydrostatic pressure of the body of water 104. For instance, the fluid may be directed from a suitable depth of the body of water 104 to enable flow of the fluid at a sufficient velocity toward the reservoirs 152, 158. Therefore, the fluid injection may occur without operation of an additional component, such as a pump, thereby limiting energy consumed by operation of the injection systems.

Each of the resource extraction systems 150, 156 may also utilize a respective generator system configured to generate electrical energy by harnessing potential energy of fluid. For example, the first resource extraction system 150 may include a first generator system 164 (e.g., turbine driven generator) positioned at an intake 165 of the first resource extraction system 150, such as on the sea floor 108. The intake 165 may receive fluid directed from the body of water 104 for intake by the first well 154. Such fluid may be directed through the first generator system 164. Thus, the first generator system 164 may generate electrical energy via the fluid directed from the body of water 104 into the first well 154. The first resource extraction system 150 may additionally or alternatively include a second generator system 166 (e.g., turbine driven generator) positioned within the first well 154. The second generator system 166 may generate electrical energy via the fluid flowing through the first well 154 (e.g., from the body of water 104 toward the first reservoir 152 to pressurize the first reservoir 152). The electrical connector 120 may electrically couple the first generator system 164 and/or the second generator system 166 to the resource processing system 112, thereby enabling flow of generated electrical energy from the generator systems 164, 166 to the resource processing system 112. Additionally or alternatively, the electrical connector 120 may electrically couple the first generator system 164 and/or the second generator system 166 to an electrical grid 168 to enable flow of generated electrical energy from the generator systems 164, 166 to the electrical grid 168.

The second resource extraction system 156 may include a third generator system 170 (e.g., turbine driven generator) positioned within the second well 162. The third generator system 170 may generate electrical energy via the fluid flowing through the second well 162, such as toward the second reservoir 158 for pressurizing the second reservoir 158. The electrical connector 120 and/or an additional electrical connector may electrically couple the third generator system 170 to the resource processing system 112 and/or the electrical grid 168 to enable flow of generated electrical energy from the third generator system 170 to the resource processing system 112 and/or the electrical grid 168.

The positioning of the generator systems 164, 166, 170 may enable desirable generation of energy via fluid flow injected into the respective reservoirs 152, 158. For example, the generator systems 164, 166, 170 may be positioned at a certain depth (e.g., between a surface 172 of the body of water 104 and the sea floor 108, at the sea floor 108, below the sea floor 108) such that a flow rate and/or velocity of the fluid flow, as driven by a gravitational force and/or hydrostatic pressure, may cause the generator systems 164, 166, 170 to generate a desirable amount of electrical energy. Indeed, positioning of the generator systems 164, 166, 170 at a greater depth (e.g., below a surface 172 of the body of water 104) may result in a greater force exerted by the fluid flow to increase power generation via the generator systems 164, 166, 170.

The first resource extraction system 150 and the second resource extraction system 156 may be independently operated from one another. By way of example, the first resource extraction system 150 may operate to direct fluid into the first reservoir 152 independently of operation of the second resource extraction system 156 to direct fluid into the second reservoir 158. In this manner, the first generator system 164 and/or the second generator system 166 may operate independently from the third generator system 170 to generate electrical energy based on the respective fluid flows directed to the reservoirs 152, 158.

In further embodiments, the system 100 may include any other suitable resource extraction system that may utilize an injection system to inject fluid into a reservoir, as well as a corresponding generator system configured to generate electrical energy via the flow of the injected fluid. As an example, the system 100 may include an offshore platform at least partially submerged in the body of water 104 and utilizing an injection system and/or generator system (e.g., to direct fluid into the first reservoir 152 to generate electrical energy). Electrical energy generated by any of the generator systems may be utilized by the offshore platform. As another example, the system 100 may include a generator system disposed within a pipeline system, such as the pipeline system 114, and configured to generate electrical energy via flow of fluid and/or resources through the pipeline system, and the generated electrical energy may be utilized by any suitable component of the system 100. Indeed, any of the resource extraction systems 150, 156 of the system 100 may share various electrical, mechanical, and/or process infrastructures with one another and/or with the resource processing system 112 to enable operations and reduce costs associated with implementation of dedicated equipment for operation of the resource extraction systems 150, 156 and/or of the resource processing system 112.

Figure 4:
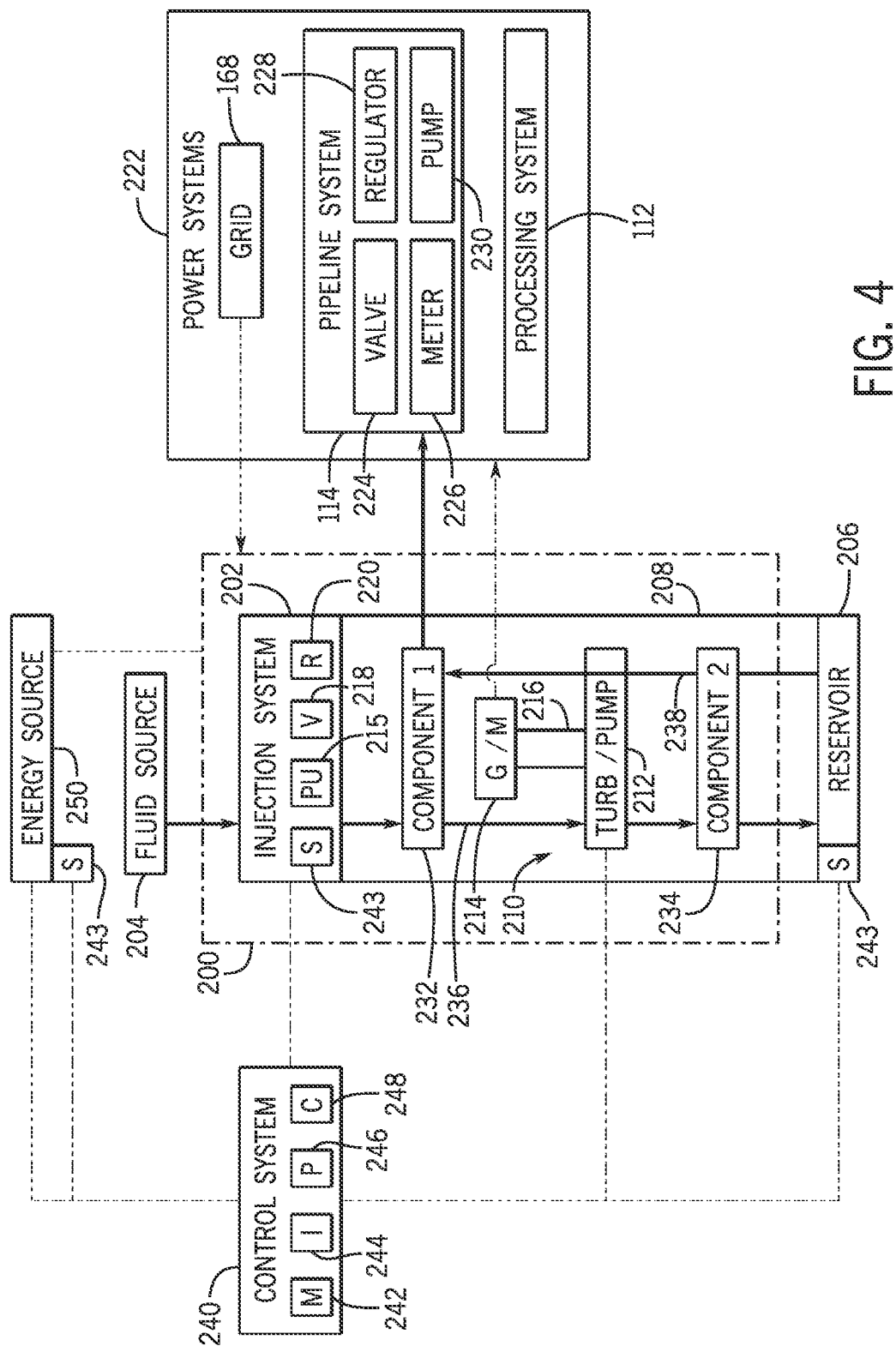
FIG. 4 is a schematic illustration of a resource extraction and/or injection system that includes a fluid injection system configured to inject fluid into a reservoir, according to an embodiment of the present disclosure.

FIG. 4 is a schematic illustration of a resource extraction and/or injection system 200 that includes an injection system 202. The injection system 202 may be fluidly coupled to a fluid source 204 (e.g., the body of water 104, the resource processing system 112) and configured to direct fluid from the fluid source 204 into a reservoir 206 via a well 208 for storage within the reservoir 206. In some embodiments, the injection system 202 may enable fluid flow from the fluid source 204 toward the reservoir 206 via a gravitational force and/or hydrostatic pressure, thereby directing the fluid flow into the reservoir 206 in a passive manner that limits energy consumption. In additional or alternative embodiments, the injection system 202 may actively drive fluid flow from the fluid source 204 toward the reservoir 206, such as via a pump. The resource extraction and/or injection system 200 may include various components disposed within the well 208, such as a generator system 210. The generator system 210 may be configured to generate electrical energy via the fluid directed by the injection system 202 into the reservoir 206. For example, the generator system 210 may include a turbine 212 coupled to a generator 214 via a shaft 216. The injection system 202 may direct the fluid to rotate the turbine 212, and rotation of the turbine 212 may drive rotation of the generator 214 via the shaft 216 to cause the generator 214 to generate electrical energy. In some embodiments, the fluid directed by the injection system 202 may bypass the generator 214 (e.g., via an enclosure shielding the generator 214) to avoid contact between the fluid and the generator 214, thereby maintaining a structural integrity of the generator 214 and increasing a useful lifespan of the generator 214.

The fluid directed via the injection system 202 may include water, such as from the body of water 104. In additional or alternative embodiments, the fluid may include another liquid, such as a liquefied gas (e.g., liquefied carbon dioxide), which may be processed or otherwise provided via the resource processing system 112. In any case, the fluid may be directed toward the reservoir 206 via a gravitational force and/or pressurization, such as via a pump 215 of the injection system 202. The fluid may also include gas or vapor, such as hydrogen and/or ammonium, in which case the pump 215 of the injection system 202 may operate to drive flow of the gas toward the reservoir 206. In further embodiments, the fluid may be any suitable energy source that is suitable for storage and later extraction. another substance (e.g., gaseous carbon dioxide) may be directed to mix with the fluid flow from the fluid source 204. As an example, the substance may be directed into the fluid source 204 and/or the well 208 and initially mix with the fluid, and the mixed fluid may drive rotation of the turbine 212 during flow toward the reservoir 206. As another example, the substance may be directed into the well 208 and bypass flow through the turbine 212. For instance, a fluid pressure within a region between the turbine 212 and the reservoir 206 may be relatively low, and the substance may be more easily directed into the relatively low pressure region, such as at reduced energy consumption, to mix with the fluid. In either case, existing production lines (e.g., the pipeline system 114) may be utilized to direct the substance for mixing with the fluid.

The resource extraction and/or injection system 200 may utilize the electrical energy generated by the generator system 210 to operate. For example, the injection system 202 may use the electrical energy to control fluid directed through the well 208 toward the reservoir 206. In some embodiments, the injection system 202 may include a valve 218 (e.g., a solenoid valve) configured to enable or block fluid flow from the fluid source 204 into the well 208 and/or a regulator 220 configured to maintain (e.g., restrict) a flow rate of the fluid from the fluid source 204 into the well 208. The electrical energy generated by the generator system 210 may be used to operate the valve 218 and/or the regulator 220.

Additionally or alternatively, the electrical energy generated by the generator system 210 may be utilized to enable operation of various power systems 222 separate from the resource extraction and/or injection system 200. As an example, the electrical energy may be distributed to the electrical grid 168 to reduce a cost associated with consuming electrical energy received from the electrical grid 168. As another example, the electrical energy may be used to enable operation of the resource processing system 112, such as to process the resources extracted from the reservoir 206.

In certain embodiments, such as for an oil reservoir, the fluid directed into the reservoir 206 may increase the pressure within the reservoir 206 and enable further extraction of resources from the reservoir 206 via the increased pressure of the reservoir 206. In such embodiments, the electrical energy may be used to enable operation of the pipeline system 114 to direct extracted resources, such as to the resource processing system 112. For instance, the electrical energy may be used to enable operation of a valve 224 (e.g., a solenoid valve) configured to direct flow of the resource through the pipeline system 114 (e.g., to enable or block flow of the resource to different parts of the pipeline system 114), a sensor or meter 226 configured to monitor a parameter (e.g., a flow rate, pressure, temperature, fluid composition, water content, solid content) associated with flow of the resource through the pipeline system 114, a regulator 228 configured to maintain (e.g., restrict) a flow rate of the resource through the pipeline system 114, and/or a pump 230 configured to increase a flow rate of the resource through the pipeline system 114. However, the generated electrical energy may be used to enable operation of any other suitable equipment, such as other monitoring, control, and/or communications equipment, other flow control equipment, equipment configured to drill (e.g., toward the reservoir 206) to form an additional well, equipment configured to produce hydrogen via a body of water in which the resource extraction and/or injection system 200 may be positioned, and so forth. Thus, the electrical energy may facilitate operations of various components.

The resource extraction and/or injection system 200 may further include a first component 232 and/or a second component 234 positioned within the well 208 to facilitate directing fluid into the reservoir 206. The first component 232 may be positioned between the generator system 210 and the injection system 202, and the second component 234 may be positioned between the generator system 210 and the reservoir 206. The injection system 202 may direct the fluid through the components 232, 234. In this manner, the fluid may be directed along a first flow path 236 from the fluid source 204, into the well 208, through the first component 232, through the turbine 212, through the second component 234, and into the reservoir 206. The components 232, 234 may include any suitable component to facilitate directing the fluid through the well 208. For example, the components 232, 234 may include any combination of valves, regulators, meters, pumps, other flow devices, other sensor devices, and the like.

In some embodiments, the fluid that was previously injected into the reservoir 206 may also be directed out of the reservoir 206 via the resource extraction and/or injection system 200, such as along a second flow path 238 from the reservoir 206. For instance, the fluid may be extracted from the reservoir 206 for additional usage in other processes and/or for re-entry into the fluid source 204 (e.g., the body of water 104). As an example, the generator 214 may operate as a motor that drives rotation of the turbine 212. The rotation of the turbine 212, as driven by rotation of the generator 214, may cause the turbine 212 to operate as a pump to direct the fluid out of the reservoir 206 (e.g., via the well 208 used to direct the fluid into the reservoir 206). For instance, the turbine 212 may include features similar to that of a compressor embodiment described in U.S. Pat. No. 9,476,427, which is incorporated herein in its entirety for all purposes. The fluid directed out of the reservoir 206 may be directed to the resource processing system 112 in some embodiments for purification, treatment, or so forth, to enable the additional usage of the fluid. For example, the fluid may be directed to the resource processing system 112 via the existing pipeline system 114 used for transporting resource flow extracted from the reservoir 206. Additionally or alternatively, the fluid may be directed to the resource processing system 112 via a separate, dedicated pipeline system (e.g., a pipeline system having any suitable length and/or volume and positioned on the sea floor 108). In some embodiments, the fluid may be directed through the first component 232 and/or the second component 234 within the well 208 during extraction. Thus, the components 232, 234 may control flow of the extracted fluid through the well 208, such as a flow rate, a flow amount, a direction of flow, and so forth. As an example, the components 232, 234 and/or other devices (e.g., the turbine 212) of the resource extraction and/or injection system 200 may be operated to provide a desirable volume and/or pressure of the flow of the extracted fluid through a corresponding pipeline system.

The resource extraction and/or injection system 200 may include or be communicatively coupled to a control system or circuitry 240 (e.g., the data processing system 60, an automation controller, a programmable controller, an electronic controller). The control system 240 may be configured to operate the resource extraction and/or injection system 200, such as to cause the injection system 202 to direct fluid from the fluid source 204 toward the reservoir 206. For example, the control system 240 may include a memory 242, which may include volatile memory, such as random access memory (RAM), and/or non-volatile memory, such as read-only memory (ROM), optical drives, hard disc drives, solid-state drives, or any other non-transitory computer-readable medium that stores instructions 244 thereon. The control system 240 may also include processing circuitry 246, which may be configured to execute the instructions 244 stored on the memory 242. For example, the processing circuitry 246 may include one or more application specific integrated circuits (ASICs), one or more field programmable gate arrays (FPGAs), one or more general purpose processors, or any combination thereof. The control system 240 may be communicatively coupled to the injection system 202. To this end, the control system 240 may include communication circuitry 248, which may be a wireless or wired communication component that may facilitate establishing a connection to enable communication and control. The communication circuitry, for example, may include any suitable communication protocol including Wi-Fi, mobile telecommunications technology (e.g., 2G, 3G, 4G, 5G, LTE), Bluetooth®, near-field communications technology, a network interface, and the like. Operation of the resource extraction and/or injection system 200 via the control system 240 may utilize electrical energy, such as electrical energy provided by the electrical grid 168 and/or electrical energy generated via the generator system 210.

In some embodiments, the control system 240 may be configured to operate the resource extraction and/or injection system 200 based on an operating parameter. For instance, the control system 240 may be communicatively coupled to one or more sensors 243 configured to monitor the operating parameter. The control system 240 may receive data from the sensor(s) 243 and operate the resource extraction and/or injection system 200 based on the data, which may be indicative of the monitored operating parameter. As an example, the operating parameter may indicate a pressure of the reservoir 206. In response to a determination that the pressure of the reservoir is below a threshold pressure (e.g., as a result of continued extraction of resource flow from the reservoir 206), the control system 240 may operate the injection system 202 to direct fluid into the reservoir 206. For example, the control system 240 may adjust the valve 218 of the injection system 202 to an open position to enable fluid flow from the fluid source 204 into the well 208 via the valve 218. Additionally, in response to a determination that the pressure of the reservoir is above the threshold pressure (e.g., prior to extraction of sufficient resource flow from the reservoir 206), the control system 240 may operate the injection system 202 to block fluid flow into the reservoir 206. For instance, the control system 240 may adjust the valve 218 to a closed position to block fluid flow from the fluid source 204 into the well 208.

The control system 240 may further operate the resource extraction and/or injection system 200 based on another operating parameter, such as a flow rate of the fluid directed through the well 208. By way of example, the control system 240 may determine a target flow rate of the fluid through the well 208, such as based on a pressure of the reservoir 206. For instance, the control system 240 may determine an increased target flow rate of the fluid based on an indication that there is a relatively low amount of fluid stored in the reservoir 206 (e.g., at early stages of operation of the injection system 202), and the control system 240 may operate the resource extraction and/or injection system 200 (e.g., by adjusting the valve 218 to increase an opening through which the fluid may flow) to adjust the flow rate of the fluid toward the increased target flow rate. The control system 240 may determine a reduced target flow rate of the fluid based on an indication that there is a relatively high amount of fluid stored in the reservoir 206 (e.g., at later stage of operation of the injection system 202), and the control system 240 may operate the resource extraction and/or injection system 200 (e.g., by adjusting the valve 218 to reduce the opening through which the fluid may flow) to adjust the flow rate of the fluid toward the reduced target flow rate.

In additional or alternative embodiments, the flow rate of the fluid directed through the well 208 may be adjusted by operating the generator 214 to provide a torque to the turbine 212 that causes the turbine 212 to resist rotation. The resistance to rotation of the turbine 212 may impart a flow resistance onto the fluid flow to cause the fluid flow to transfer energy to drive rotation of the turbine 212, thereby reducing the flow rate of the fluid flow. Changing the torque provided to the turbine 212 may adjust the resistance to rotation of the turbine 212 to adjust the flow rate of the fluid toward the target flow rate. For instance, a greater amount of torque may be provided to the turbine 212 to increase flow resistance imparted by the turbine 212 and cause increased flow rate reduction of the fluid flow. In further embodiments, the generator system 210 may have multiple stages or quantities of turbines 212, each imparting additional flow resistance onto the fluid flow. In such embodiments, the flow rate reduction of the fluid flow may be based on a quantity of turbines 212 through which the fluid flow may be directed. For example, directing the fluid through more turbines 212 may increase reduction of the flow rate of the fluid. As such, the fluid flow may be controlled to flow through a particular quantity of turbines 212 and/or to bypass a particular quantity of turbines 212 to reduce the flow rate of the fluid flow to the target flow rate. For instance, the fluid flow through the turbines 212 may be selectively controlled via a valve, a conduit (e.g., a bypass line), a pump, or any combination thereof.

Further still, in some embodiments, the resource extraction and/or injection system 200 (e.g., the injection system 202, the components 232, 234) may also be configured to utilize electrical energy provided by another energy source 250 separate from the electrical grid 168. As such, the energy source 250 and the generator system 210 may share electrical infrastructure (e.g., electrical connectors) and reduce a cost associated with implementation of dedicated electrical infrastructure for enabling the resource extraction and/or injection system 200 to utilize electrical energy from the generator system 210 and/or the energy source 250. The energy source 250 may include another generator separate from the generator 214, a renewable energy source (e.g., a wind turbine, a wave energy converter, a hydropower system, a solar cell), a power storage, and the like. The operating parameter monitored by the sensor(s) 243 may include available electrical energy provided by the energy source 250, such as electrical energy being generated by the energy source 250 and/or electrical energy stored at the energy source 250. The control system 240 may operate the resource extraction and/or injection system 200 based on such an operating parameter. As an example, in response to a determination that the available electrical energy for provision via the energy source 250 is below a threshold value, the control system 240 may operate the injection system 202 to direct fluid toward the reservoir 206 and cause the turbine 212 to generate electrical energy via the fluid flow. In this manner, the control system 240 may increase electrical energy generated via operation of the injection system 202, such as regardless of whether the pressure of the reservoir 206 is above a threshold pressure, to increase electrical energy for usage while the available electrical energy associated with the energy source 250 is relatively low.

In certain embodiments, the control system 240 may be configured to operate the resource extraction and/or injection system 200 to transition between directing fluid toward the reservoir 206 and extracting fluid from the reservoir 206. As an example, the control system 240 may be communicatively coupled to the generator 214 and may operate the generator 214 as a motor to drive rotation of the turbine 212 to direct the fluid out of the reservoir 206 (e.g., via the well 208 used to direct the fluid into the reservoir 206). In such embodiments, the control system 240 may selectively operate the turbine 212 (e.g., a reversible turbine or a reversible compressor configured to alternate between operation to be driven by fluid flow toward the reservoir and to drive fluid flow from the reservoir 206) in a first operating mode to inject fluid into the reservoir 206 or in a second operating mode to pressurize the fluid and direct the fluid out of the reservoir 206.

In some embodiments, the control system 240 may operate the resource extraction and/or injection system 200 to extract fluid in response to a determination that there is sufficient available electrical energy for usage, such as that electrical energy available from the energy source 250 is above a threshold value, electrical energy generated by the generator system 210 is above a threshold value, and the like, to reduce consumption of electrical energy from the electrical grid 168 or to reduce other energy costs. For example, when the energy source 250 has excess energy production above the current energy demand, then the excess energy production may be used to extract the fluid from the reservoir to increase the available space in the reservoir. Given that energy is generated while injecting the fluid into the reservoir, the increased space in the reservoir results in an increase in the energy production capacity when the fluid is later injected into the reservoir.

Further still, in some embodiments, the control system 240 may also be configured to operate the resource extraction and/or injection system 200 to pressurize the resource flow from the reservoir 206 to facilitate extraction of resources, such as during a relatively early life cycle of operation prior to injection of fluid toward the reservoir 206. For example, the control system 240 may operate the turbine 212 as a compressor or pump (e.g., by driving rotation of the turbine 212 via the generator 214) to direct the resources out of the reservoir 206. In this manner, a common set of equipment may be used for generating electrical energy via fluid directed into the reservoir 206, extracting previously injected fluid out of the reservoir 206, and for extracting resources from the reservoir 206 (e.g., using the same well 208), thereby reducing a cost and/or complexity associated with manufacture, installation, and/or operation of different components of the resource extraction and/or injection system 200. In additional or alternative embodiments, separate components dedicated to directing fluid flow into the reservoir 206, extracting fluid flow from the reservoir 206, and/or extracting resource flow from the reservoir 206 may be implemented to provide increased configurability to select particular components (e.g., components of a certain type, embodiment, or specification) for providing more desirable or suitable control of fluid flow and/or resource flow. For instance, separate wells may be used to direct the fluid into the reservoir 206, to direct the fluid out of the reservoir 206, and/or to direct the resources out of the reservoir 206. In additional or alternative embodiments, the resource extraction and/or injection system 200 may include separate equipment (e.g., a separate turbine and compressor) dedicated to generate electrical energy via fluid directed into the reservoir 206 and to extract fluid and/or resources from the reservoir 206.

Figure 5:
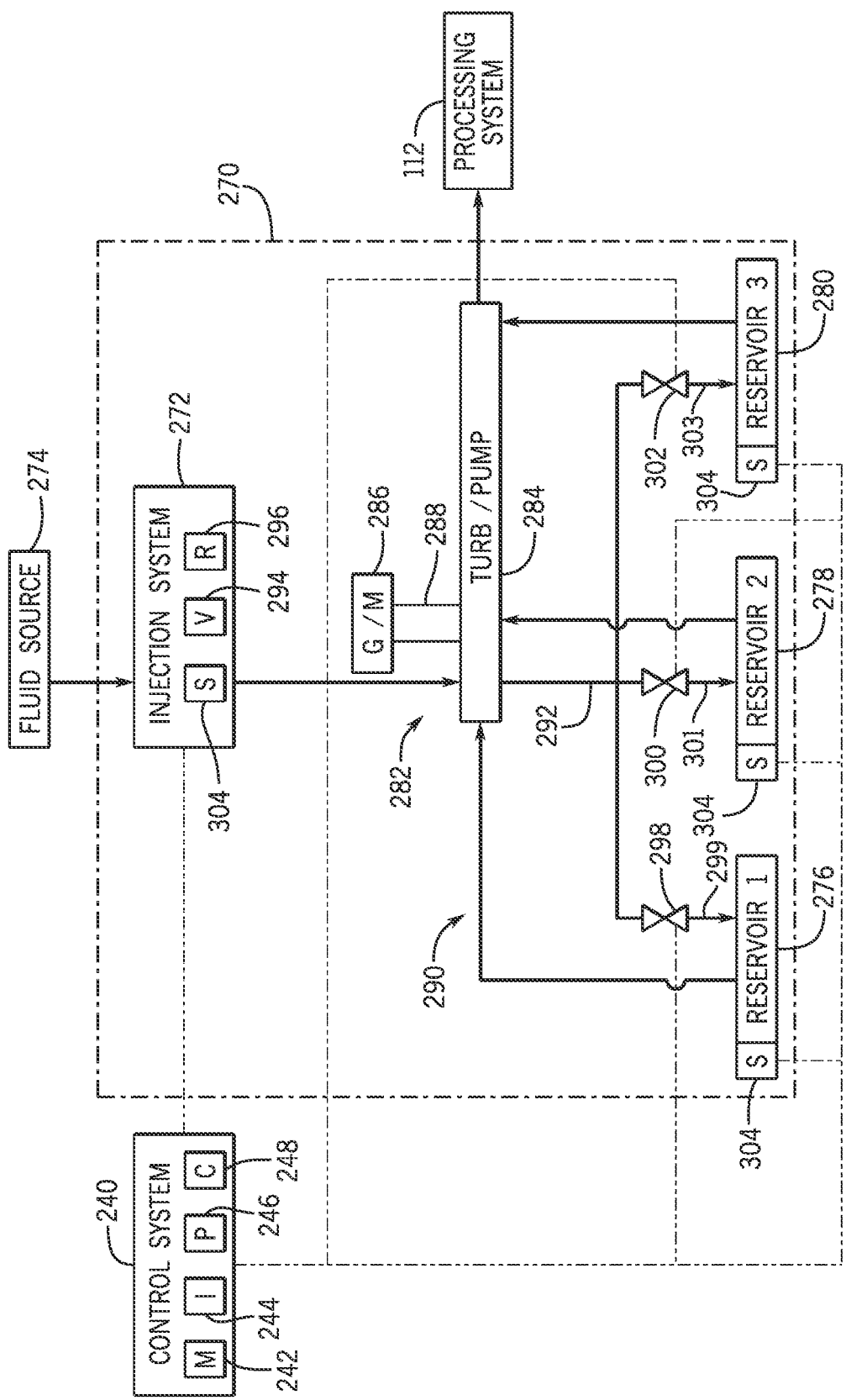
FIG. 5 is a schematic illustration of a resource extraction and/or injection system that includes a fluid injection system configured to inject fluid into multiple reservoirs, according to an embodiment of the present disclosure.

FIG. 5 is a schematic illustration of a resource extraction and/or injection system 270 that includes an injection system 272. The injection system 272 may be configured to direct fluid from a fluid source 274 to multiple reservoirs, such as a first reservoir 276, a second reservoir 278, and/or a third reservoir 280 (e.g., via separate wells), such as by utilizing a gravitational force and/or hydrostatic pressure. The resource extraction and/or injection system 270 may include a generator system 282 configured to generate electrical energy via the fluid flow. For example, the generator system 282 may include a turbine 284 through which fluid may be directed via the injection system 272 to cause rotation of the turbine 284. The turbine 284 may be coupled to a generator 286 via a shaft 288, and rotation of the turbine 284, as driven by the fluid, may cause rotation of the generator 286 via the shaft 288, thereby enabling the generator 286 to generate electrical energy. The electrical energy may then be utilized to enable operation of the resource extraction and/or injection system 270 and/or the resource processing system 112.

The control system 240 may be communicatively coupled to the injection system 272 and may operate the injection system 272 to control fluid directed by the injection system 272 toward the reservoirs 276, 278, 280. For example, the control system 240 may operate a valve 294 of the injection system 272 to enable or block fluid flow from the fluid source 274 toward the reservoirs 276, 278, 280. The control system 240 may also operate a regulator 296 to maintain a flow rate of the fluid from the fluid source 274 toward the reservoirs 276, 278, 280. Thus, the control system 240 may enable the resource extraction and/or injection system 200 to direct fluid for storage in each of the reservoirs 276, 278, 280, such as for abandonment of the reservoirs 276, 278, 280.

In certain embodiments, the resource extraction and/or injection system 270 may include a conduit system 290 to facilitate flow of the fluid to the reservoirs 276, 278, 280. For example, the conduit system 290 may include a junction 292, wherein the fluid may be distributed between the reservoirs 276, 278, 280. A first valve 298 of the conduit system 290 may control fluid flow from the junction 292 to the first reservoir 276 (e.g., via a first conduit 299 of the conduit system 290 in a first well), a second valve 300 of the conduit system 290 may control fluid flow from the junction 292 to the second reservoir 278 (e.g., via a second conduit 301 of the conduit system 290 in a second well), and a third valve 302 of the conduit system 290 may control fluid flow from the junction 292 to the third reservoir 280 (e.g., via a third conduit 303 of the conduit system 290 in a third well).

The control system 240 may be communicatively coupled to each of the valves 298, 300, 302 to control fluid flow to the reservoirs 276, 278, 280. As an example, the control system 240 may independently operate the valves 298, 300, 302 and selectively direct fluid flow to the reservoirs 276, 278, 280. For instance, the control system 240 may be configured to receive data from one or more sensors 304, and the data may be indicative of respective pressures of the reservoirs 276, 278, 280. In response to a determination that the pressure of one of the reservoirs 276, 278, 280 is below an associated threshold pressure, the control system 240 may open a corresponding valve 298, 300, 302 to enable fluid flow to the reservoir 276, 278, 280. In this manner, the control system 240 may operate the valves 298, 300, 302 to control fluid flow more suitably based on the particular pressure of each reservoir 276, 278, 280. The control system 240 may also operate the resource extraction and/or injection system 270 (e.g., the injection system 272, the conduit system 290) based on different operating parameters, such as available electrical energy (e.g., generated by the generator system 282, from another energy source), a flow of the fluid, a flow of the resource, and the like.

Fluid may also be extracted from each of the reservoirs 276, 278, 280. In the illustrated embodiment, the turbine 284 may be operated as a pump (e.g., by operating the generator 286 as a motor) to extract fluid from each of the reservoirs 276, 278, 280, and the extracted fluid may flow from the reservoirs 276, 278, 280 through conduits that are separate from the conduits 299, 301, 303 through which the fluid may be directed into the reservoirs 276, 278, 280. Thus, the extracted fluid may not flow through the valves 298, 300, 302. However, in additional or alternative embodiments, the extracted fluid may flow through the same conduits 299, 301, 303 through which the fluid is directed into the reservoirs 276, 278, 280 and may therefore be directed through the valves 298, 300, 302. The extracted fluid may flow out of the respective wells of the reservoirs 276, 278, 280 and to the resource processing system 112. The control system 240 may also operate the valves 298, 300, 302 (e.g., by opening or closing a particular one of the valves 298, 300, 302) to selectively extract fluid from certain reservoirs 276, 278, 280, such as based on an operating parameter (e.g., a reservoir pressure) indicative of available fluid within the reservoirs 276, 278, 280.

Each of FIGS. 6-8 described below illustrates a respective method for operating any of the resource extraction and/or injection systems having an injection system, as described above. Any suitable device (e.g., the processing circuitry 246 of the control system 240) may perform each method. In one embodiment, the methods may be implemented by executing instructions (e.g., the instructions 244) stored in a tangible, non-transitory, computer-readable medium (e.g., the memory 242). For example, each method may be performed at least in part by one or more software components, one or more hardware components, one or more software applications, and the like. While each method is described using operations in a specific sequence, additional operations may be performed, the described operations may be performed in different sequences than the sequence illustrated, and/or certain described operations may be skipped or not performed altogether. Further still, the respective methods may be performed in any suitable relationship with one another, such as in parallel or in series with one another.

Figure 6:
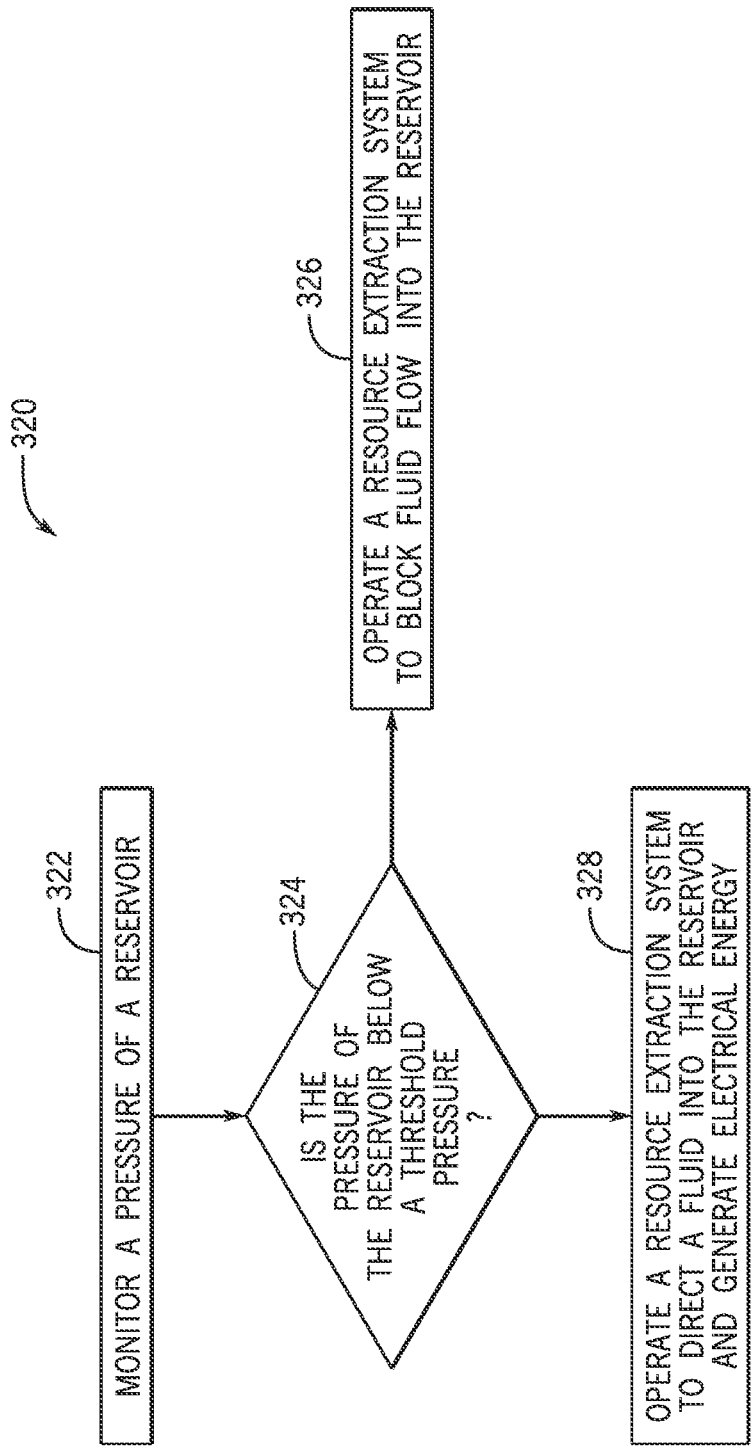
FIG. 6 is a flowchart of an embodiment of a method for operating a resource extraction and/or injection system to direct a fluid into a reservoir, according to an embodiment of the present disclosure.

FIG. 6 is a flowchart of an embodiment of a method 320 for operating a resource extraction and/or injection system to direct a fluid into a reservoir. At block 322, a pressure of the reservoir may be monitored. As an example, data may be received from a sensor, and the data may indicate the pressure of the reservoir. At block 324, a determination may be made regarding whether the pressure of the reservoir is below a threshold pressure, which may indicate whether resources may readily flow from the reservoir for extraction.

At block 326, in response to a determination that the pressure of the reservoir is above the threshold pressure, the resource extraction and/or injection system may be operated to block fluid flow from a fluid source into the reservoir. For example, the pressure of the reservoir being above the threshold pressure may indicate that the resources may be extracted from the reservoir (e.g., via the reservoir pressure, via pressurization provided by the resource extraction and/or injection system). In some embodiments, an injection system of the resource extraction and/or injection system may be operated to block fluid flow from the fluid source into the well toward the reservoir by closing a valve to block fluid flow through the well. In additional or alternative embodiments, operation of a pump configured to direct the fluid flow from the fluid source may be suspended to block fluid flow through the well.

At block 328, in response to a determination that the pressure of the reservoir is below the threshold pressure, the resource extraction and/or injection system may be operated to direct the fluid flow from the fluid source into the reservoir, such as to seal the reservoir and prepare the reservoir for abandonment. As an example, the injection system may be operated to open a valve to enable fluid flow from the fluid source, through the well, and into the reservoir (e.g., via a gravitational force, via hydrostatic pressure). Directing fluid flow into the reservoir may cause generation of electrical energy. For instance, the fluid flow may drive rotation of a turbine of a generator system, and the rotation of the turbine may cause a generator of the generator system to generate electrical energy. The electrical energy may then be used (e.g., for operating the injection system) and/or stored for later usage. An amount of electrical energy generated may be based on a flow rate of the fluid through the generator system, a depth of the fluid source (e.g., a height of the water column above the turbine), a position of the generator system (e.g., within the fluid source, within the well), an amount of fluid directed into the reservoir, a volume of the reservoir, a depth of the reservoir (e.g., underneath the fluid source), and/or a pressure level to which the reservoir is pressurized via the fluid.

Multiple operations of the method 320 may be concurrently performed for different reservoirs. For example, the method 320 may be respectively and independently performed for different reservoirs to enable and/or block fluid flow to the reservoirs. In this manner, fluid flow may be enabled for a certain reservoir and blocked for another reservoir, such as based on comparisons between respective pressures of the reservoirs with a corresponding threshold pressure. As such, the method 320 may be performed to selectively pressurize different reservoirs and more suitably extract resources from each reservoir. Electrical energy may also be correspondingly generated via the respective fluid flows directed into the reservoirs.

Figure 7:
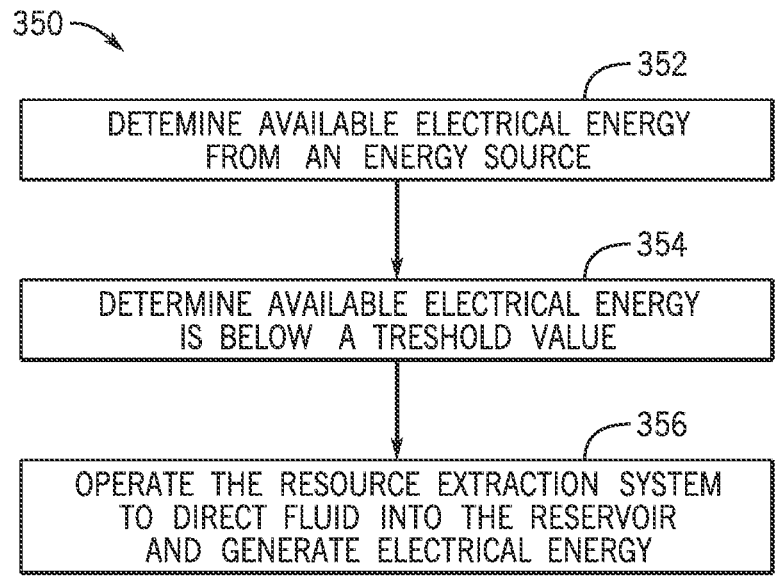
FIG. 7 is a flowchart of an embodiment of a method for operating a resource extraction and/or injection system to direct a fluid into a reservoir, according to an embodiment of the present disclosure.

FIG. 7 is a flowchart of an embodiment of a method 350 for operating a resource extraction and/or injection system to direct a fluid into a reservoir. At block 352, available electrical energy from an energy source may be determined. For example, the energy source may include a component (e.g., a wind turbine, a solar cell) configured to generate electricity. Thus, the available electrical energy may be a rate in which electrical energy is generated via the energy source. Additionally or alternatively, the energy source may include a power source configured to store electrical energy, and the available electrical energy may be an amount of stored electrical energy. The available electrical energy may be determined via data received from a sensor.

At block 354, a determination is made that the available electrical energy from the energy source is below a threshold value. As an example, a rate in which electrical energy is generated via the energy source may be below a threshold rate. As another example, an amount of electrical energy stored at the energy source may be below a threshold amount. Therefore, there may be an undesirably or relatively low amount of available electrical energy from the energy source.

At block 356, in response to determining the available electrical energy from the energy source is below the threshold value, the resource extraction and/or injection system may be operated to direct fluid into the reservoir, such as via operation of an injection system and/or a valve. Directing the fluid into the reservoir may cause a generator to generate electrical energy. For example, in response to a determination that the available electrical energy from the energy source is below the threshold value, the fluid may be directed into the reservoir to cause generation of electrical energy and therefore compensate for the relatively low available electrical energy from the energy source. The generated electrical energy may be readily utilized. In this manner, overall generation and/or storage of a desirable amount of available electrical energy (e.g., via the energy source and the resource extraction and/or injection system) may be maintained.

Figure 8:
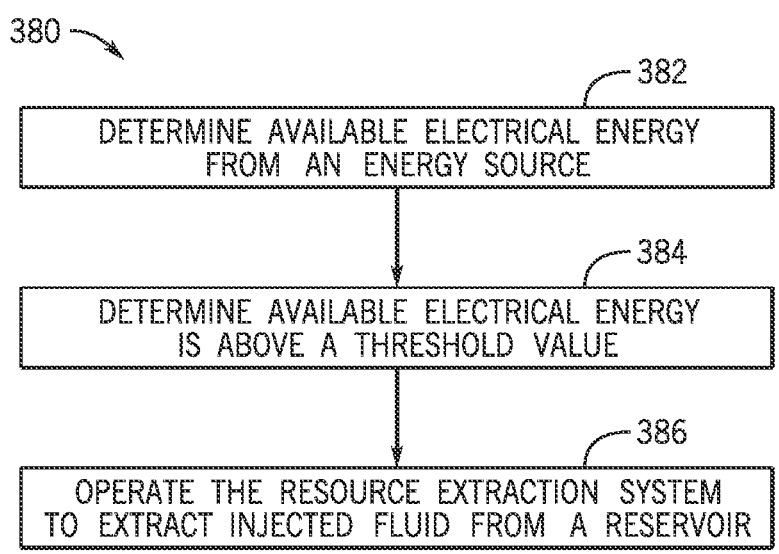
FIG. 8 is a flowchart of an embodiment of a method for operating a resource extraction and/or injection system to extract a fluid from a reservoir, according to an embodiment of the present disclosure.

FIG. 8 is a flowchart of an embodiment of a method 380 for operating a resource extraction and/or injection system to extract a fluid from a reservoir. At block 382, available electrical energy from an energy source may be determined. The energy source may operate intermittently such that available electrical energy may vary. For example, the available electrical energy may be a rate in which electrical energy is generated via the energy source and/or an amount of electrical energy stored at the energy source.

At block 384, a determination is made that the available electrical energy from the energy source is above a threshold value. As an example, the rate in which electrical energy is generated via the energy source may be above a threshold rate. As another example, an amount of electrical energy stored at the energy source may be above a threshold amount. In this manner, there may be an excess amount of available electrical energy from the energy source.

At block 386, the resource extraction and/or injection system may be operated to extract fluid from a reservoir. In particular, the fluid may have been previously directed into the reservoir, such as resulting from performance of the method 320 and/or the method 350. Operation of the resource extraction and/or injection system to extract the fluid from the reservoir may consume electrical energy, such as the available electrical energy from the energy source. In some embodiments, a turbine (e.g., a reversible turbine) of the resource extraction and/or injection system, which may operate to enable generation of electrical energy while fluid is directed into the reservoir, may operate as a pump to direct the fluid out of the reservoir. The fluid may then be directed to a processing system and/or a pipeline buffer to process (e.g., purify) the fluid for further usage, such as for redirecting into a body of water.

While the subject disclosure is described through the above embodiments, it will be understood by those of ordinary skill in the art that modification to and variation of the illustrated embodiments may be made without departing from the inventive concepts herein disclosed. Moreover, while some embodiments are described in connection with various illustrative structures, one skilled in the art will recognize that the system may be embodied using a variety of specific structures.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A resource extraction and/or injection system, comprising:
    an injection system configured to direct a fluid into a reservoir via a well for controlling a pressure of the reservoir;
    a generator positioned in the well, the generator being configured to convert potential energy of the fluid into electrical energy via flow of the fluid through the well; and
    a control system configured to operate the injection system to direct the fluid into the reservoir such that the generator generates the electrical energy, wherein:
        the control system operates the injection system to direct the fluid into the reservoir in response to the pressure of the reservoir being below a threshold pressure; and
        the control system operates the injection system to direct the fluid into the reservoir irrespective of the pressure of the reservoir in response to available electrical energy from an energy source being below a threshold value.

2. The resource extraction and/or injection system of claim 1, wherein the control system is configured to:
    determine an operating parameter indicative of the pressure of the reservoir; and
    operate the injection system to direct the fluid into the reservoir in response to determining that the pressure of the reservoir indicated by the operating parameter is below the threshold pressure;
    wherein the pressure of the reservoir being below the threshold pressure is indicative of a limited amount of resources in the reservoir for extraction or a limited flow of resources from the reservoir for extraction.

3. The resource extraction and/or injection system of claim 1, wherein the fluid directed into the reservoir via the injection system comprises water from a body of water, and the injection system is configured to direct the water from the body of water toward the reservoir via a gravitational flow.

4. The resource extraction and/or injection system of claim 1, comprising a turbine, wherein the turbine and the generator are coupled to one another via a shaft, the injection system is configured to direct the fluid into the reservoir and through the turbine to cause rotation of the turbine, and the rotation of the turbine drives rotation of the generator to generate the electrical energy.

5. The resource extraction and/or injection system of claim 1, wherein the injection system is configured to direct the fluid into an additional reservoir via an additional well for storage in the additional reservoir, and the resource extraction and/or injection system comprises a conduit configured to receive the fluid directed via the injection system and distribute the fluid for injection into the reservoir, the additional reservoir, or both.

6. The resource extraction and/or injection system of claim 5, wherein the conduit comprises a first valve and a second valve, and wherein the control system is communicatively coupled to the conduit and configured to:
operate the first valve to control flow of the fluid into the reservoir; and
operate the second valve to control flow of the fluid into the additional reservoir.

7. The resource extraction and/or injection system of claim 1, wherein the threshold pressure is indicative of an ability to extract resources from the reservoir.

8. The resource extraction and/or injection system of claim 1, wherein the energy source is configured to generate electrical energy, and wherein the control system operates the injection system to direct the fluid into the reservoir irrespective of the pressure of the reservoir in response to a rate at which the electrical energy is generated by the energy source being below a threshold rate.

9. A system, comprising:
a generator system comprising a turbine positioned in a well, wherein the generator system is configured to generate electrical energy via rotation of the turbine;
an injection system configured to direct a fluid through the well and into a reservoir for controlling a pressure of the reservoir, wherein flow of the fluid through the well causes the rotation of the turbine, thereby causing the generator system to generate the electrical energy; and
a controller configured to operate the injection system to direct the fluid into the reservoir such that the generator system generates the electrical energy, wherein:
the controller operates the injection system to direct the fluid into the reservoir in response to the pressure of the reservoir being below a threshold pressure; and
the controller operates the injection system to direct the fluid into the reservoir irrespective of the pressure of the reservoir in response to available electrical energy from an energy source being below a threshold value.

10. The system of claim 9, wherein the controller is configured to:
determine an operating parameter indicative of the pressure of the reservoir; and
operate the injection system to direct the fluid into the reservoir in response to the operating parameter indicating that the pressure is below the threshold pressure to increase the pressure of the reservoir;
wherein the pressure of the reservoir being below the threshold pressure is indicative of a limited amount of resources in the reservoir for extraction or a limited flow of resources from the reservoir for extraction.

11. The system of claim 9, comprising:
an intake configured to receive the fluid directed via the injection system into the reservoir, and
a second generator system positioned at the intake, the second generator system being configured to generate electrical energy via flow of the fluid at the intake.

12. The system of claim 9, comprising an electrical connector that electrically couples the generator system to a power system, wherein the electrical connector is configured to direct the electrical energy generated by the generator system to the power system.

13. The system of claim 9, wherein the controller is communicatively coupled to the generator system, and wherein the controller is configured to operate the turbine as a pump to extract resources from the reservoir.

14. The system of claim 9, wherein the fluid directed by the injection system comprises water, carbon dioxide, hydrogen, ammonium, nitrogen, natural gas, a polymeric solution, or any combination thereof.

15. The system of claim 9, wherein the injection system comprises a pump or compressor configured to drive the fluid toward the reservoir.

16. A resource extraction system, comprising:
a fluid injection system configured to inject a fluid into a reservoir via a well for controlling a pressure of the reservoir;
a turbine positioned in the well, the turbine being configured to rotate via flow of the fluid therethrough toward the reservoir;
a generator coupled to the turbine, wherein the generator is configured to generate electrical energy via rotation of the turbine caused by the flow of the fluid; and
a control system configured to operate the fluid injection system to inject the fluid into the reservoir such that the generator generates the electrical energy, wherein:
the control system operates the fluid injection system to inject the fluid into the reservoir in response to the pressure of the reservoir being below a threshold pressure; and
the control system operates the fluid injection system to inject the fluid into the reservoir irrespective of the pressure of the reservoir in response to available electrical energy from an energy source being below a threshold value.

17. The resource extraction system of claim 16, wherein the control system is configured to operate the fluid injection system to inject the fluid into the reservoir in response to a determination that the pressure of the reservoir is below the threshold pressure, and wherein the pressure of the reservoir being below the threshold pressure is indicative of a limited amount of resources in the reservoir for extraction or a limited flow of resources from the reservoir for extraction.

18. The resource extraction system of claim 17, wherein the control system is configured to operate the fluid injection system to block the flow of the fluid toward the reservoir in response to a determination that the pressure of the reservoir is above the threshold pressure and a determination that the available electrical energy from the energy source is above the threshold value.

19. The resource extraction system of claim 16, comprising a pump or compressor configured to extract the fluid injected into the reservoir via the fluid injection system.

20. The resource extraction system of claim 19, wherein the control system is configured to:

operate the pump or compressor to extract the fluid from the reservoir in response to a determination that the available electrical energy from the energy source is above a second threshold value.

* * * * *